United States Patent [19]

Sweeney et al.

[11] Patent Number: 4,466,759

[45] Date of Patent: Aug. 21, 1984

[54] METHOD AND APPARATUS FOR SEQUENCE CONTROL OF VERTICAL MOVEMENTS OF SLURRIED PARTICULATES

[75] Inventors: William T. Sweeney, Ponca City, Okla.; Rick L. Shaw; Frederick A. Webb, both of Bethel Park, Pa.

[73] Assignee: Conoco Inc., Ponca City, Okla.

[21] Appl. No.: 351,101

[22] Filed: Feb. 22, 1982

[51] Int. Cl.³ .............................................. B65G 53/66
[52] U.S. Cl. .................................... 406/15; 137/115; 417/299; 406/99; 406/197
[58] Field of Search ................ 406/99, 109, 106, 197, 406/14, 15; 137/119, 115; 417/440, 900, 299

[56] References Cited

U.S. PATENT DOCUMENTS

| | | | |
|---|---|---|---|
| 3,260,548 | 7/1966 | Reichl | 406/106 X |
| 3,723,025 | 3/1973 | Coakley | 417/299 |
| 3,966,261 | 6/1976 | Doerr et al. | 406/109 X |
| 4,244,388 | 1/1981 | Feiss | 417/299 |

FOREIGN PATENT DOCUMENTS 761330  6/1967  Canada ............................... 406/106

*Primary Examiner*—Jeffrey V. Nase
*Attorney, Agent, or Firm*—William J. Miller

[57] ABSTRACT

A method and apparatus for sequence control of vertical movement of slurried particulates from a lower level to the upper levels, more particularly a vertical hoist system for movement of slurry from a subterranean mine area upward through an earthen or cased borehole to a surface station. The vertical pump system includes series-connected pumps having variable speed capability to transport slurry particulate from an underground sump upward to a surface surge tank or other repository. The logic sequence system exercises control over valving sequence between the underground pumps and the vertical borehole in order to control slurry surges during start-up, shut-down and emergency dump operations. Thus, the pump input to the vertical conduit utilizes energy dissipator units as selectively controlled by automated block and by-pass valves to control flow of fluids from the pumps upward through the vertical conduit. Selective control of the dissipator units and valving enable critical start-up, shut-down and the emergency shut-down operations and this is effected by particular sequence control.

8 Claims, 4 Drawing Figures

METHOD AND APPARATUS FOR SEQUENCE CONTROL OF VERTICAL MOVEMENTS OF SLURRIED PARTICULATES

BACKGROUND OF THE INVENTION

1. Field of the Invention

The invention relates generally to vertical pumping of slurries of particulate matter and, more particularly, but not by way of limitation, it relates to a vertical hoist pumping system and associated process control for moving coal slurry over appreciable vertical distances.

2. Description of the Prior Art

The prior art includes numerous forms of short distance vertical pumping equipment as utilized in diverse manufacturing and mining processes; however, there are but few comparable vertical pumping systems which are intended for moving slurried material from an integrally associated mine slurry system through a vertical earthen or cased borehole of considerable length for operative connection to an overland slurry transport system. U.S. Pat. No. 3,982,789 to Funk teaches vertical pipelining of slurry from a mine sump upward to surface processing equipment. The system utilizes a rotary gate metering system in combination with a centrifugal pump to transmit slurried heavies while fines are separately collected for introduction into the vertical pipeline. Vertical pipelining in general has also been employed in several German mine systems; however Applicant has no knowledge of any prior process control similar to the present system.

SUMMARY OF THE INVENTION

The present invention relates to improvements in the pump movement of slurried material through a vertical flow way and the associated process control for maintaining flow pressure, and flow rate within requisite limits during continuous operation. The vertical pump system includes series-connected pumps having variable speed capability and receiving slurried material from a mine system at a first level, and the pumps thereafter direct the slurried material through a flow way such as a borehole up to a surface or second level whereupon the slurried material is temporarily deposited in a surge tank and thereafter repumped by a surface pump system for overland transport to a distant repository. The logic sequence system of the present invention exercises control over the valving sequence between pumps and vertical borehole in order to control slurry surges during start-up, shutdown and emergency dump operations. Thus, pump output is connected to a motor-operated valve and by-pass dissipator unit as well as to a main block valve leading to the vertical borehole. A second motor-operated valve connected downstream from the main block valve leads to a dump dissipator unit. A central logic control unit then regulates the valving at required speeds and sequence in accordance with the particular operation.

Therefore, it is an object of the present invention to provide a valve sequence control system for vertical pumping of slurried material.

It is also an object of the present invention to provide a logic control which selectively dissipates slurry pressure head in accordance with borehole dimensions to establish a vertical flow rate at a desired operational level.

It is still further an object of the present invention to provide a pump pressure control system utilizing variable speed pump drive which is more easily controlled and susceptible of close surveillance.

Finally, it is an object of the present invention to provide a logic sequence control system for a variable speed pump system which enables safe and reliable start-up, stop and emergency dump operations for a large volume vertical pumping system.

Other objects and advantages of the invention will be evident from the following detailed description when read in conjunction with the accompanying drawings which illustrate the invention.

DETAILED DESCRIPTION OF THE INVENTION

Figure 1:
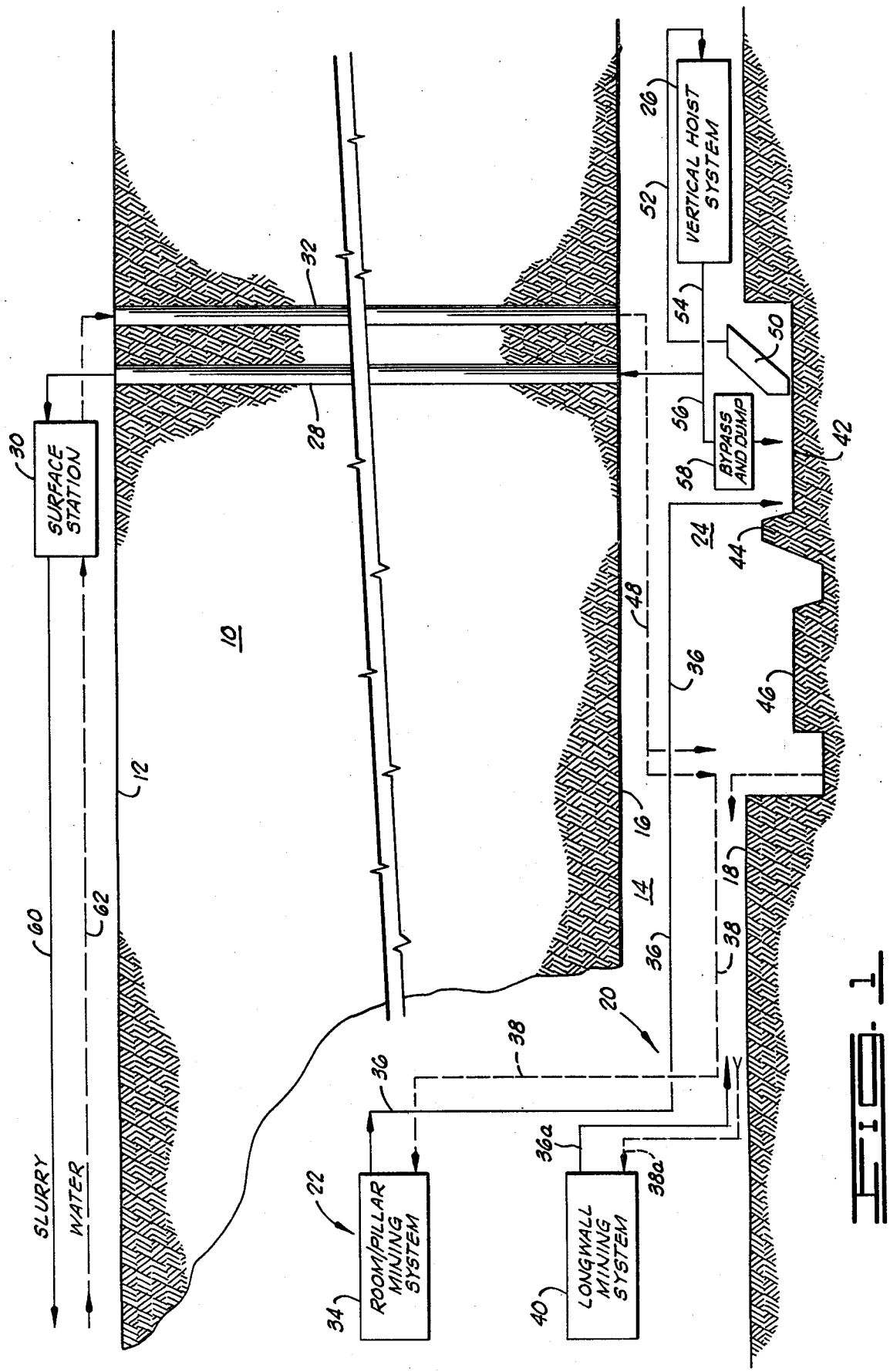
FIG. 1 is an idealized block diagram of a mining system including surface and mine tunnel installations.

FIG. 1 illustrates a total slurry mining system in an earth section 10 having a surface 12 and mine tunnel 14 as defined by tunnel roof 16 and floor 18. It should be understood, of course, that in the very large coal mines there may be a number of tunnels 14 on a plurality of different subsurface levels. In particular, the illustration of FIG. 1 includes an interconnect piping system 20 which provides water-slurry transportation interconnection between a plurality of mining stations 22 and a centrally located sump 24, a repository for coal slurry and subsequent entry into the vertical pump system 26 which moves the slurry vertically through a borehole 28, e.g. earthen, cased or the like, to a surface station 30. Water supply from surface station 30 is also returned downward through a borehole 32 for replenishment to the interconnect system 20 and sump 24.

The mining stations 22 consist of plural different coal removal stations throughout the tunnel 14; thus, stations 22 may include a room and pillar installation 34, such system consisting of a mining machine at the coal face in communication with a slurry hopper and an extensible hose system in interconnection with a slurry line 36 and return water line 38 of interconnect system 20. In like manner, a long wall mining installation 40 may also connect into interconnect system 20. The long wall mining machinery is also a well-known type consisting of a long wall mining machine in communication with a coal conveyor and slurry injection skid in connection with slurry line 36a and return water line 38a. Since the length of slurry lines 36 and water lines 38 may be considerable, on the order of miles, booster pump stations are provided as necessary along the extension route of interconnect system 20.

The slurry line 36 and water line 38 extend to the sump 24 which serves as a central collector for the mined material wherein it is once more prepared for vertical movement up through borehole 28. The sump 24 consists of a slurry pit 42 which is separated by an overflow weir 44 from a water and fines pit 46. Sump 24 is actually of elongated rectangular form and may be quite large, on the order of 300 feet long and 20 feet wide. The slurry line 36 is continually dumped into slurry pit 42 and pumps (not shown) remove water from water pit 46 for return to water line 38 of interconnect system 20. Replenishment water, as needed, from borehole 32 is available via supply water line 48 to either water pit 46 or water line 38 as control valving directs.

Slurry from the coal pit 42 is picked up by such as a continuously moving dredge 50 for passage through a slurry line 52 to the vertical pump system 26. Slurry output from the vertical pump system 26 is then applied via a slurry line 54 up through earth borehole 28 to surface station 30. A slurry line 56 also leads to a bypass and dump station 58, apparatus which is actuated in response to certain line conditions, as will be further described.

The surface station 30 includes a surge tank and surface pump system which then provides power for transportation overland via slurry line 60 as system water is returned via water line 62. The slurry line 60 may include a number of booster stations and valving facilities and may extend for a number of miles overland to a final finishing station whereupon washing, grading and the like is carried out prior to further disposition of the particulate material.

Figure 2:
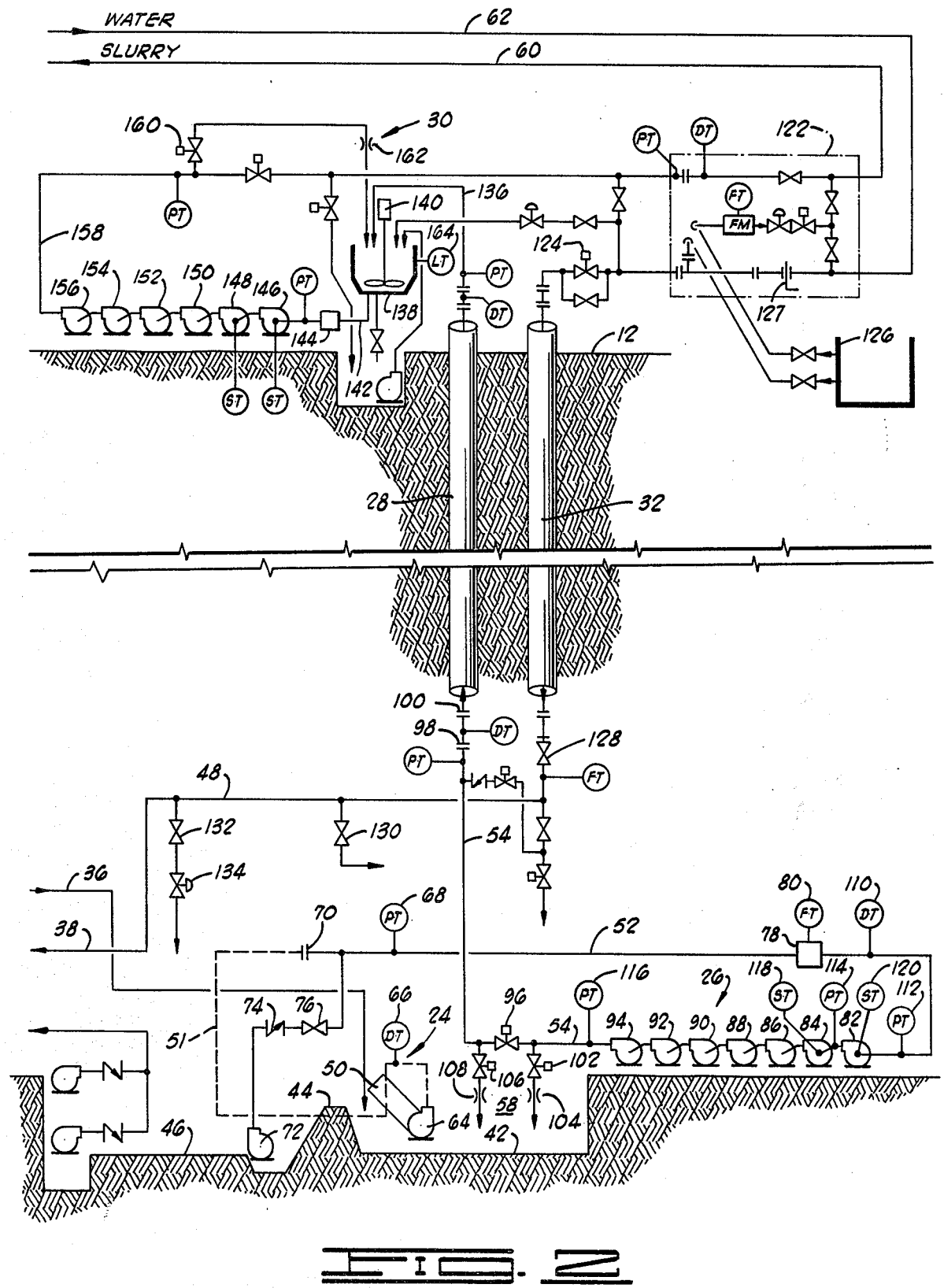
FIG. 2 is a schematic illustration of the vertical pumping system of the present invention including mine level and surface level installations.

FIG. 2 illustrates in greater detail the sump 24 and vertical pump system 26 in interconnection with boreholes 28 and 32 to earth surface 12 and surface station 30. The dredge 50 including dredge pump 64 is controllably moved about slurry pit 42 to pick up slurry for transmission via a flexible line 51 to a slurry line 52 for delivery to the vertical pump system 26. A density transmitter 66 is in communication with the output slurry line 52 and continuously monitors slurry density for indication and control at a central control panel, such control station being located at a suitable disposition adjacent the sump 24 and vertical pump station 26. Also, certain of the operational controls may be remotely accessed from a surface station. A pressure transmitter 68 provides indication of slurry line downstream behind a slurry hose coupling 70 and a weir pump 72 functioning through a check valve 74 and hand-operated valve 76.

Slurry line 52 is then applied through a flow meter 78 having flow transmitter 80, a Fischer and Porter magnetic flow meter, and further conducted for input to the first in a plurality of series-connected pumps. The first two pumps 82 and 84 in the series are variable speed drive pumps, and these operate into constant speed pumps 86, 88, 90, 92 and 94 with final slurry output to slurry ine 54. Each of the pumps 94 is a commercially available type, a Warman Model 14/12 TAHP Slurry Pump. The constant speed pumps 86-94 are each belt-driven by a 500 horsepower electric motor while the variable speed pumps 82 and 84 are driven through a variable speed fluid clutch by 700 horsepower electric motors, as will be further described.

The slurry line output 54 is then conducted through a motor operated valve 96 and further slurry line 54 through flange couplings 98 and 100 into the lower-end of earth borehole 28 for transmission to the surface. A motor operated valve 102 passes slurry to a dissipator 104 during start-up bypass operations, and a motor operated valve 106 passes slurry fluid from the downstream side of valve 96 to a dissipator 108 during emergency dump operations. The dissipator devices 104 and 108 function to provide a high input pressure and reduction in outlet fluid volumetric flow rate when activated.

Control data is transmitted to the central control panel by a plurality of sensor devices. Thus, slurry flow rate through flow meter 78 is sent by a flow transmitter 80, and density information is sent from a density transmitter 66. Pressure transmitters 112, 114 and 116 provide requisite data for each of the pump input, output of first variable speed drive pump 82, and final pump output, and the speed transmitters 118 and 120 provide central control indication of the respective first and second variable speed pumps 82 and 84. The control data outputs at the central control panel also interface with a central logic controller, e.g., a Texas Instruments Model 5T1 Programmable Logic Controller, which functions to carry out various automatic activations.

Primary water supply comes through surface line 62 to a transfer station 22 and proceeds under control of a motor operated valve 124 down the water borehole 32 to the lower level. A very large primary water reservoir 126 is also located near transfer station 122 to receive water flow through a selected branch determined by a removable plug or blind 127. At the second or lower level, water enters through a hand-operated valve 128 to line 48 which then couples to line 38 for interconnect system distribution. A hand-operated valve 130 provides output for auxilliary water uses, and a hand-operated valve 132 through pneumatic valve 134 provides feed system water makeup into pit 46 of sump 24.

The surface station 30 carries out slurry processing and pumping for the overland transport system. Thus, slurry upcoming from borehole 28 is conducted through a slurry line 136 and dumped into surge tank 138 which is constantly agitated by a motor-driven mixer 140. Balanced water supply is also controllably added to surge tank 138 as slurry may be withdrawn via line 142 through a flow meter 144 for entry into the overland pumping system which consists of series-connected pumps, i.e., variable speed pumps 146 and 148 and constant speed pumps 150, 152, 154 and 156. Selected flow output from the pumps is then present on slurry line 158 through transfer station 122 to the overland slurry line 60. A motor-operated valve 160 provides start-up bypass slurry relief through a dissipator 162 which directs reduced slurry flow back into surge tank 138. A level transmitter 164 in communication with surge tank 138 continually monitors slurry level and transmits level information down to the central control panel, as will be further described.

Figure 3:
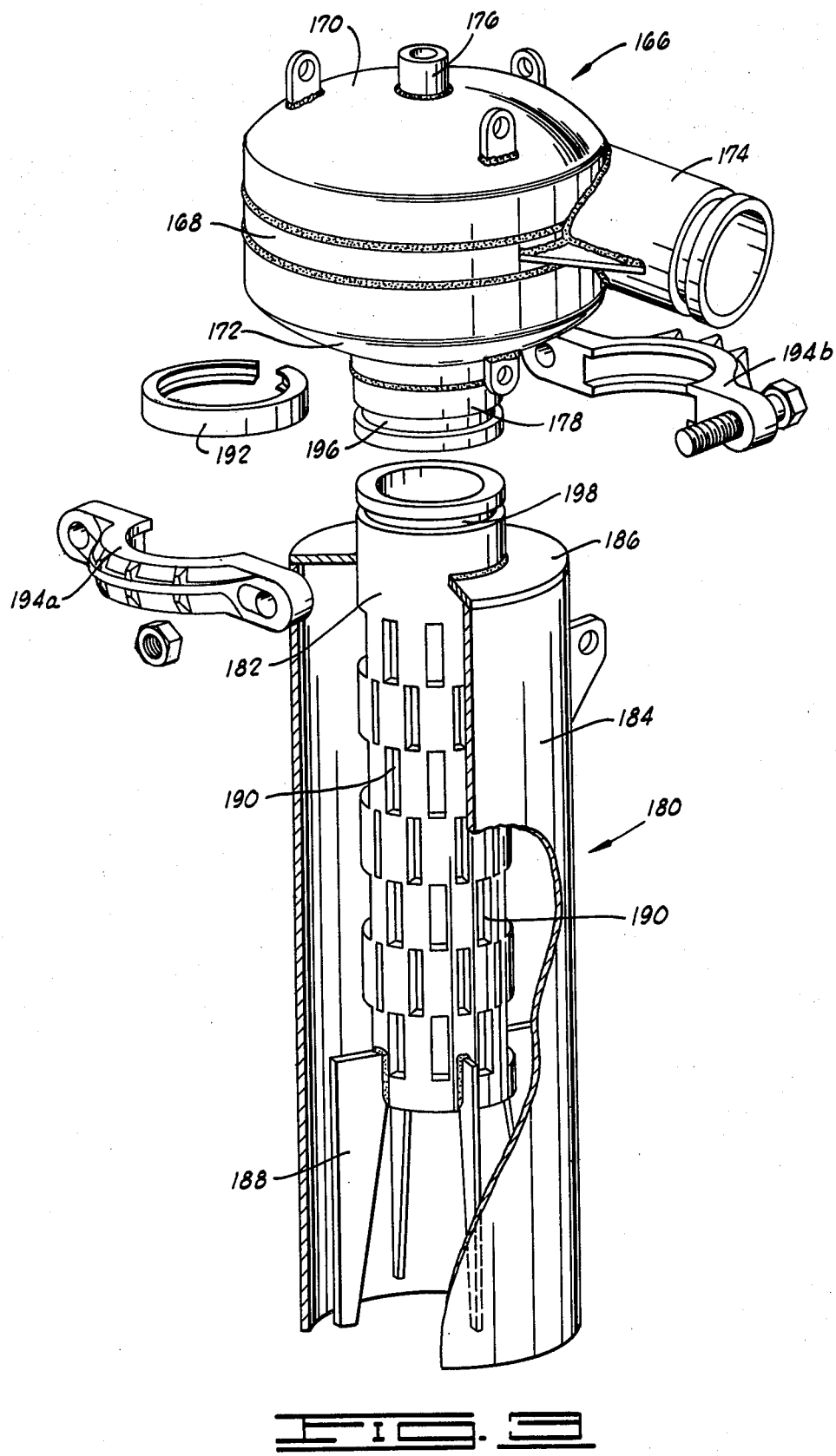
FIG. 3 is a perspective view with parts shown exploded and in cutaway of a dissipator unit as used in the present invention.

FIG. 3 illustrates a dissipator unit as utilized in the present invention. Such a dissipator unit is the particular subject matter of a U.S. Pat. No. 4,333,499 and entitled "Pressure Dissipation Apparatus". The dissipator unit is comprised of a first centrifugal member which accepts fluid under a high pressure and high volume and converts the flow to high velocity and low-pressure; and, thereafter, the axially flowing slurry is further reduced to a low velocity, low pressure flow at the lower output end. The characteristic design of the particular form of dissipator unit is due largely to the necessity for handling slurried particulate matter such as coal slurry in relatively large volume.

A member 166 having cylindrical sidewall 168, upper plate 170 and lower plate 172 receives slurry input tangentially by means of input conduit 174. A relatively small axial air vent 176 is provided in upper plate 170 to provide vacuum relief for the inside of member 166, and either air or a suitable fluid can be inserted through vent 176 to prevent cavitation beneath upper plate 170. The vortex formed within member 166 then extends through or substantially through axial outlet conduit 178 formed through bottom plate 172.

A lower member 180 then receives high velocity, reduced pressure fluid output from conduit 178 and converts the final output to low velocity, low pressure fluid output. The member 180 essentially comprises an inner cylinder 182 and an outer concentric cylinder 184 which is retained thereon by a circular mounting plate 186 secured as by welding. A quadrature array of vertical fins 188 are attached between the bottom of cylinder 182 to extend adjacent the inside wall of cylinder 184. A plurality of rows of circumferentially spaced slots 190 are cut through inner cylinder 182 to aid in velocity reduction of the slurried particular matter. Coupling of members 166 and 180 may be provided by such as a gasket 192 functioning in co-action with a bolt-secured split ring 194 seated in conduit grooves 196 and 198.

In operation, when high pressure, high velocity fluids are introduced into conduit 174, they are reduced through centrifugal interference for direction through an axial vortex at conduit 178 at high velocity and lowered pressure. Further axial travel of the flurry material down through baffle member 180, i.e., inner cylinder 182, slots 190 and outer cylinder 184, reduces the slurried material velocity to provide a low velocity, low pressure output there below.

Figure 4:
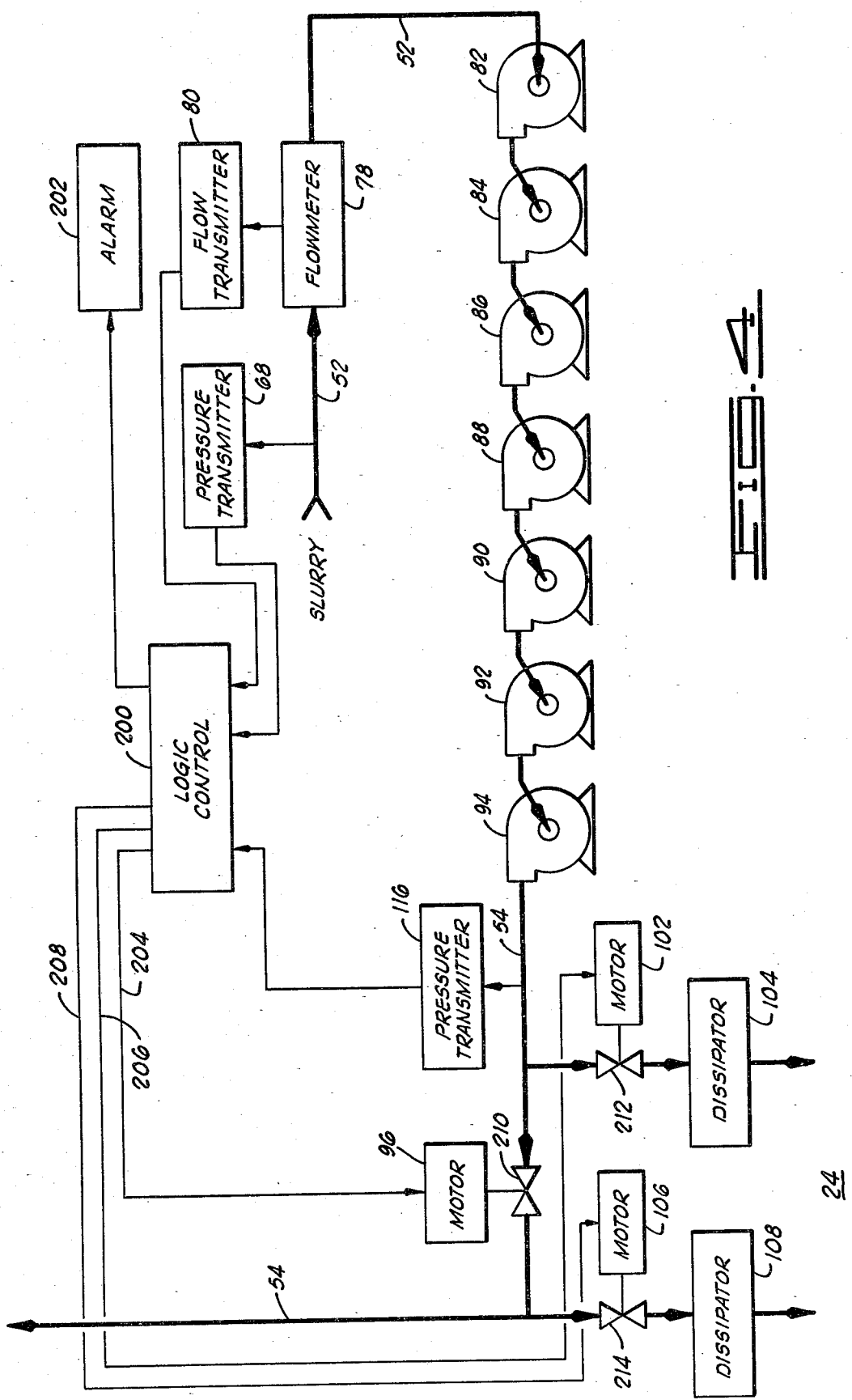
FIG. 4 is a block diagram of the sequence control system of the present invention.

Referring to FIG. 4, the sequence logic system is under control of a central logic control 200 which receives input from operator, interval sequence logic and the like, and functions to exercise control of the system operation. An alarm 202 is connected to receive an alarm output from logic control 200, and motor control outputs are provided on lines 204, 206 and 208 for controlling, respectively, a main block valve 210, a by-pass dissipator valve 212, and a dump dissipator valve 214. As aforementioned, the logic control 200 in one present design is a Texas Instruments Models 5T1 Programmable Logic Controller as is commercially available from Texas Instruments of Dallas, Tex.

In start-up sequence, the dissipator valve 212 is placed in the open position and main block valve 210 is closed, and the series pumps 82-94 are started up to move water, i.e. water or what is known as "black water", from the sump 24 by means of pump 72 to conduit 52 for eventual output via conduit 54. As pressure builds up in conduit 54, it is pumped through the open valve 212 and dissipator 104 back into sump 24. This by-pass using dissipator 104 serves to maintain an increasing pressure on line 54 as the water is by-pass dumped back into the sump 24. The pressure on line 54 must attain a predetermined pressure head in order to be satisfactorily introduced into the vertical conduit or borehole 28 (FIG. 2).

Thus, the dissipator 104 produces sufficient pressure on the station output line 54 to overcome the borehole pressure head, at which time motor 96 is operated to rapidly open block valve 210 to allow water flow up through the vertical borehole 28. Thereafter, logic control 200 functions to operate motor 102 to effect a relatively slow incremental closure of dissipator valve 212. When valve 212 is completely closed, the pump slurry proceeds through conduit 54 and the vertical borehole 28 at relatively constant flow rate, variables then being controlled by other operational flow parameters that are not material to pump start-up considerations. Particular matter is then introduced from dredge pump 64 (FIG. 2) via the movable slurry ine 51 through coupling 70, and transport operation proceeds under central control. Normal shut down of the system is effected by the inverse of operations carried out in start-up.

When conditions require an emergency shut-down, other factors of operation must be taken into consideration. Thus, with untimely cessation of operation of pumps 82-94 or under conditions of uncontrolled reduction of flow within the pipe, e.g. an abnormal condition at surface station 30, the very great volume of slurried particulate up within borehole 28, e.g., 800 or 900 feet, would fall downward to the valve and conduit structure below with undesirable effects. In the case of such emergency shutdown, logic control 200 functions to incrementally close main block valve 210 while throwing dump dissipator valve 214 wide open, thereby to allow the downward descending slurried particulate to proceed into the dump dissipator 108 where reduction of both velocity and pressure is effected as the slurried material is returned to sump 24. The logic control 200 also opens bypass valve 212 thereby to inhibit movement of dredge 50 through sump 42. This action allows the vertical hoist pumps to be flushed with water as they will normally remain running along with dredge pump 64.

By way of example, in one present design the by-pass dissipator 104 is designed to produce borehole pressure head at 6,000 gallons per minute such that opening of block valve 210 and gradual closure of by-pass valve 212 will experience little or no pressure fluctuation; and, when by-pass valve 212 is completely closed the slurry will be flowing at 6,000 gallons per minute up through the vertical borehole. During an emergency dump operation, the flow rate may be as high as 17,000 gallons per minute downward from the borehole, and this rate is reduced by dump dissipator 108 to a lowered flow rate on the order of 7,000 to 8,000 gallons per minute, a flow rate which can be more easily handled in the operation. Thus, the by-pass dissipators are designed for about 6,000 gallons per minute and the dump dissipators are designed slightly smaller but to handle a slightly larger energy dissipation, i.e., pressure dissipation.

The foregoing discloses a novel sequential control system for maintaining proper pressure and flow rate within a vertical slurry line of considerable length during startup, shutdown and emergency shutdown operations. Such borehole transmission of slurry may be maintained over very great heights, e.g., 850 feet, from the working level to the surface, and the pressure and flow control system of the present invention is capable of maintaining the necessary flow rates within the vertical flow line during all phases of the pumping operation as well as during emergency situations that might arise through the continuous operation.

Changes may be made in combination and/or arrangement of elements as heretofore set forth in the specification and shown in the drawing; it being understood that changes may be made in the embodiments disclosed without departing from the spirit and scope of the invention as defined in the following claims.

The embodiments of the invention in which an exclusive property of privilege is claimed are defined as follows:

1. A method for controlling flow start-up of a water and a particulate slurry from a lower level path upward through an elongated vertical conduit, comprising:
   closing said path from said lower level to said elongated vertical conduit;
   opening a path to a bypass;

pumping the water to a predetermined pressure head at said lower level; while, dissipating said water out of said bypass until said pressure reaches said predetermined pressure head; then, opening said path from said lower level to said vertical conduit; and, simultaneously incrementally closing said path from said lower level to said bypass while maintaining steady flow up said vertical conduit.

2. A method as set forth in claim 1 which further comprises the steps of:

introducing particulate into the water being pumped at said lower level when steady flow through said vertical conduit occurs.

3. A method for controlling flow start-up and emergency shut-down of a water and particulate slurry from a lower level upward through an elongated vertical conduit; comprising:

pumping the water up to a predetermined pressure head at said lower level;

directing the water up through said vertical conduit and maintaining said predetermined pressure head;

introducing particulate into the water being pumped at said lower level and maintaining steady flow transport of slurried particulate up through the vertical conduit;

rapidly directing slurried particulate flow from said vertical conduit to a dump dissipator at commencement of shut-down and emergency dump operations; and incrementally stopping flow of the pumped slurried particulate to said vertical conduit.

4. Apparatus for controlling flow of a slurried particulate from a lower level upward through an elongated vertical conduit, comprising:

conduit means at the lower level;

pump means disposed at said lower level to receive water and increase the pressure head in said conduit means to a predetermined amount;

block valve means connecting said conduit means to said vertical conduit;

by-pass dissipator means in communication with a slurry repository;

by-pass valve means connecting said conduit means to said by-pass dissipator;

first control means to rapidly open said block valve means and incrementally close said by-pass valve means when said predetermined pressure head is attained thereby to initiate water flow up the vertical conduit; and means for introducing particulate into said water to be received by said pump means.

5. Apparatus as set forth in claim 4 which is further characterized to include:

dump dissipator means in communication with a slurry repository;

dump valve means that is normally closed connecting said vertical conduit to said dump dissipator means; and second control means to open said dump valve means and incrementally close said block valve means during shut-down and emergency dump operation to release slurry from said vertical conduit through said dump dissipator means.

6. Apparatus as set forth in claim 5 wherein said first and second control means comprise:

dump motor means controlling said dump valve means;

by-pass motor means controlling said by-pass valve means;

block motor means controlling said block valve means; and logic control means responsive to sensed slurry pressure and flow conditions to selectively energize said dump, by-pass and block motor means.

7. Apparatus as set forth in claim 4 wherein:

said vertical conduit is an earth borehole extending from a lower mining level to the earth surface.

8. Apparatus as set forth in claim 5 wherein:

said vertical conduit is an earth borehole extending from a lower mining level to the earth surface.

* * * * *